(12) United States Patent
Ancona et al.

(10) Patent No.: US 7,457,463 B2
(45) Date of Patent: Nov. 25, 2008

(54) SYSTEM AND METHOD FOR THE MEASUREMENT OF THE RELATIVE POSITION OF AN OBJECT WITH RESPECT TO A POINT OF REFERENCE

(75) Inventors: Nicola Ancona, Bari (IT); Giovanni Attolico, Bari (IT); Antonella Branca, Bari (IT); Grazia Cicirelli, Bari (IT); Arcangelo Distante, Bari (IT); Marco Malavasi, Bari (IT); Ettore Stella, Bari (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 769 days.

(21) Appl. No.: 10/466,437

(22) PCT Filed: Jan. 23, 2002

(86) PCT No.: PCT/IT02/00039

§ 371 (c)(1),
(2), (4) Date: Dec. 12, 2003

(87) PCT Pub. No.: WO02/061684

PCT Pub. Date: Aug. 8, 2002

(65) Prior Publication Data

US 2005/0074161 A1 Apr. 7, 2005

(30) Foreign Application Priority Data

Jan. 29, 2001 (IT) .................. RM2001A0000045

(51) Int. Cl.
*G06K 9/00* (2006.01)

(52) U.S. Cl. .......................... 382/181; 382/190; 463/4; 273/247

(58) Field of Classification Search ................ 382/181, 382/100, 106, 107, 151, 156, 154, 168, 190, 382/199, 280, 216, 224, 228, 255; 463/4, 463/31, 1, 2; 273/108.52, 317.3, 317.5, 108.56, 273/108.1, 108.4, 108.5, 118 A, 119 A, 129 W, 273/357, 119 R, 118 R, 247; 345/166, 547, 345/501, 536; 359/412, 407
See application file for complete search history.

(56) References Cited

U.S. PATENT DOCUMENTS 4,893,182 A * 1/1990 Gautraud et al. ............ 348/579
5,138,322 A * 8/1992 Nuttall ........................ 342/126

(Continued)

FOREIGN PATENT DOCUMENTS

EP 0 662 600 A1 7/1995

(Continued)

*Primary Examiner*—Sheela C Chawan
(74) *Attorney, Agent, or Firm*—Birch, Stewart, Kolasch & Birch, LLP

(57) ABSTRACT

A method and a system for measurement of the relative position of an object with respect to a point of reference which includes acquiring a plurality of images, each of said images being adapted to display the point of reference, processing each image of the plurality of acquired images, the step of processing each image further including the step of recognizing the object inside each of the images performed by a classifier and training with examples adapted to the construction of the classifier, and computing the relative position of the object with respect to the point of reference.

26 Claims, 12 Drawing Sheets

U.S. PATENT DOCUMENTS

| | | | | |
|---|---|---|---|---|
| 5,798,519 A * | 8/1998 | Vock et al. | | 250/206.1 |
| 5,822,115 A * | 10/1998 | Umeda et al. | | 359/412 |
| 5,863,248 A * | 1/1999 | Mine et al. | | 463/4 |
| 6,028,956 A * | 2/2000 | Shustorovich et al. | | 382/156 |
| 6,280,323 B1 * | 8/2001 | Yamazaki et al. | | 463/4 |
| 6,320,173 B1 * | 11/2001 | Vock et al. | | 250/206.1 |
| 6,400,831 B2 * | 6/2002 | Lee et al. | | 382/103 |
| 6,449,010 B1 * | 9/2002 | Tucker | | 348/157 |
| 6,816,185 B2 * | 11/2004 | Harmath | | 348/157 |
| 6,829,085 B2 * | 12/2004 | Abe | | 359/410 |

FOREIGN PATENT DOCUMENTS

| | | |
|---|---|---|
| EP | 0 902 395 A1 | 3/1999 |
| WO | WO 00/72264 A1 | 11/2000 |
| WO | WO 01/43072 A1 | 6/2001 |

\* cited by examiner

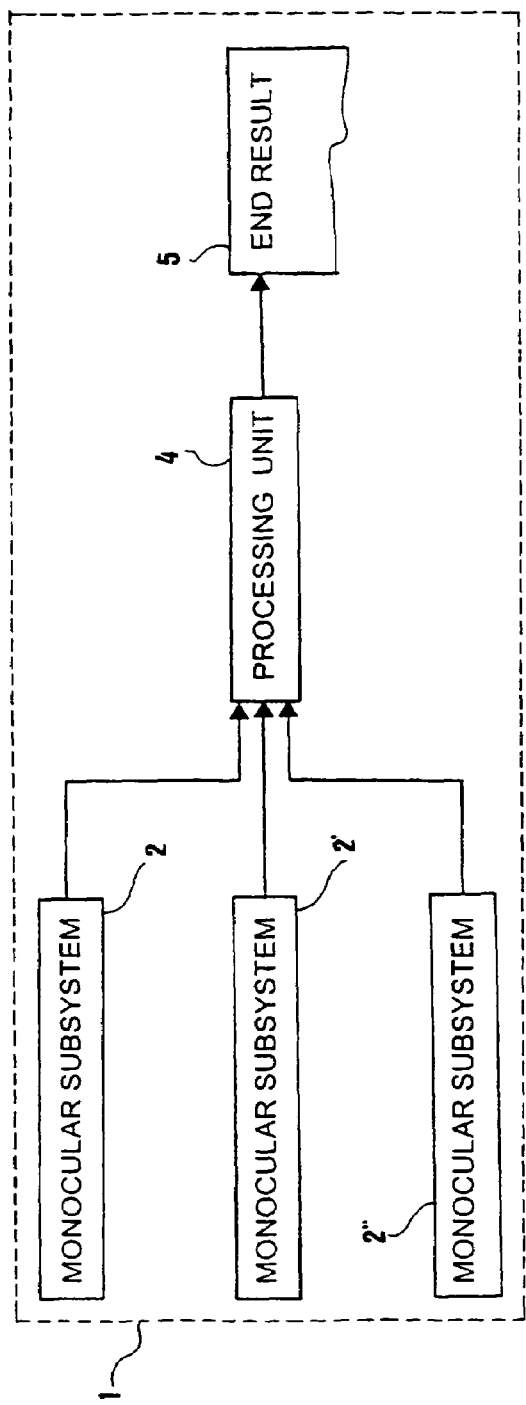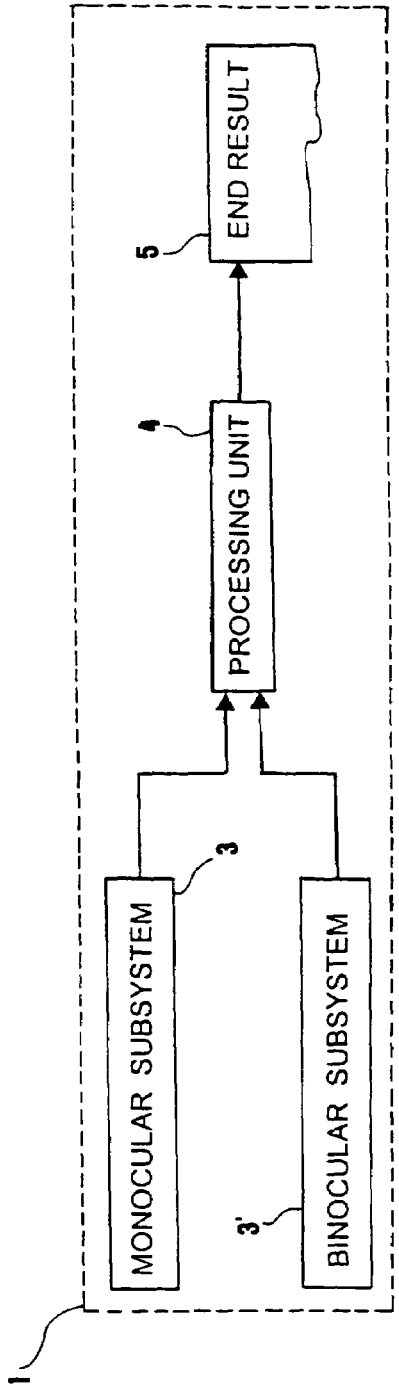

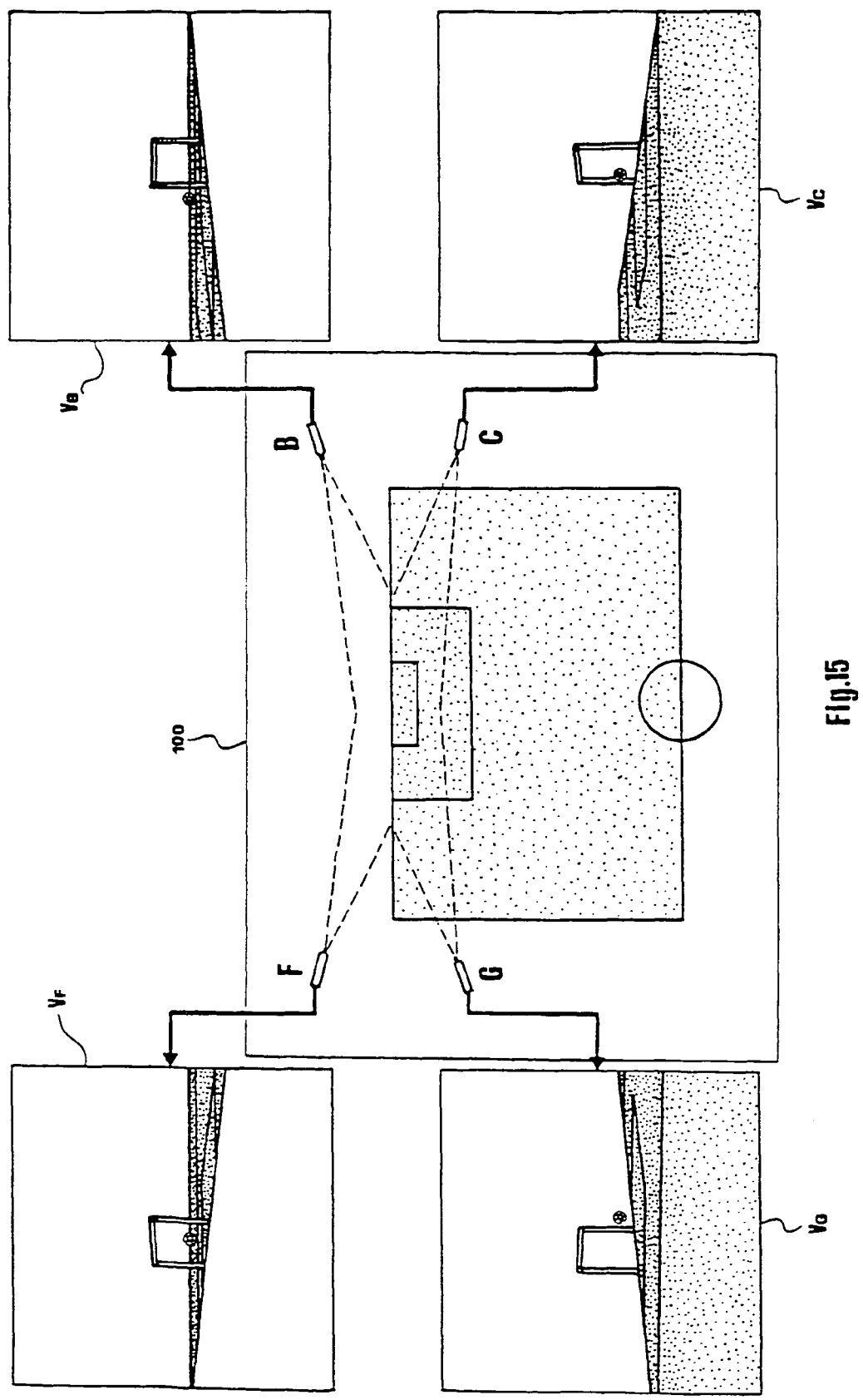

SYSTEM AND METHOD FOR THE MEASUREMENT OF THE RELATIVE POSITION OF AN OBJECT WITH RESPECT TO A POINT OF REFERENCE

BACKGROUND AND SUMMARY OF THE INVENTION

The present invention refers to a system and to a method for the measurement of the relative position of an object with respect to a predetermined point of reference.

An exemplary application of the system and of the method according to the present invention is that of the measurement of the relative position of a ball with respect to a specific line of a field of play.

In several sports, a referee acknowledges an event depending on the relative position of a ball with respect to a specific line of the field of play. e.g., in Soccer a referee awards a score to a team only when the ball has crossed over the goal line.

However, the referee can autonomously note the scoring of a goal solely when the latter is apparent, e.g. due to the swelling out of the netting or to the ball remaining inside of the goal. However, quite frequently the ball crosses over the goal plane and, without touching the net, immediately exits therefrom due to an odd rebound onto the soccer held, produced by contact with the goal posts, or a player's clearance.

When the ball speed is not overly high (it could even reach the 120 Km/h) the referee, in order to decide on the event at issue, can be aided by assistants, who however should have ideal observing conditions, i.e. be positioned on the goal line having the goal in sight. Otherwise the referee, having to decide one way or the other, runs the risk of awarding a non-existent (phantom) scored goal, or of not awarding an actually scored goal.

To solve this problem, several known systems, all referable to the same category, provide the use of sensors, inserted inside of the goal structure, receiving a signal from transmitters applied into the playing ball when the latter crosses the goal mouth.

However, such systems entail the remarkable disadvantage of being invasive, requiring electronic devices to be inserted in the playing structures (goals and ball). Hence, in order to use the former a general modification to the fields of play and the use of specific balls would be required. These devices are not always applicable, as the modification required to the playing structures could interfere with the laws of the game.

Moreover, a known visual-type system relies instead on the observation of the field of play by suitably positioned cameras. This system determines the position of the vertical projection of the center of mass of the ball onto the plane of the field of play, exploiting the information (known a priori) on the dimensions of the various areas thereof.

However, this system entails the disadvantage of exclusively detecting the ball crossing over a determined line, yet providing no indication about the height above ground of the ball during its crossing, an information crucial in order to confidently claim that the ball has crossed over the goal plane.

A first system for determining the position of an object in a space is known by WO 00/72264. Such system provides for the identification of the object into the images by means of the so-called chroma-key system that operates by comparing areas of the images with a treshold.

Another system is disclosed in EP 0662600. In such case a system is provided for determining the absolute spatial position of an object.

Nevertheless, such system has several drawbacks. In particular the system is only capable of determining the position of an object that moves on a single plan, in a predetermined direction.

Furthermore, the recognition of the object into the acquired images is simply performed by comparison with fixed tresholds, making the result dependent from the environmental conditions.

Purpose of the present invention is to solve the abovecited problems of the known art providing a method for the measurement of the relative position of an object with respect to a point of reference, comprising the following steps:

acquiring a plurality of images, each of said images being apt to display said point of reference;

processing each image of said plurality of acquired images; and computing said relative position of said object with respect to said point of reference, characterised in that said step of processing each image further comprises a step of recognizing said object inside each of said images, said step of recognizing said object being performed by a classifier.

The present invention further provides a system for the measurement of the relative position of an object with respect to a point of reference comprising:

one or more image acquisition subsystems, each subsystem being apt to acquire a plurality of images, each of said images displaying said point of reference; and a unit for the processing of said acquired images, characterised in that said processing unit comprises a classifier for recognising said object inside each of said image.

Hence, a field of play comprising such system could advantageously be provided.

For simplicity's sake, hereinafter reference will still be made to the application of the system in the case of Soccer. Of course, it is umderstood that the described system and method could be useful in any other application entailing the same technical problem.

The main advantage of the method and of the system according to the present invention lies in that those entail no modification to any component of the field of play, or to the ball.

A second advantage lies in the robustness and in the reliability of the detection of the scored goal event. Said method integrates a geometrical measurement of the position of the ball in the three-dimensional space (obtained by a binocular system) to a qualitative assessment of the observed event (obtained with a monocular system) thereby emulating the activity of a human observer enjoying the best observing conditions. The integration of the measurements provided by said systems ensures a high precision rate and a minimum error probability in any situation, including those of partial ball obstruction, e.g. by one or more players.

A third advantage lies in the completeness of the information on the position of the object with respect to a point of reference, as the method provides the three-dimensional coordinates thereof.

A fourth advantage lies in that the system according to the present invention uses, for image acquisition, high-speed digital cameras, whose performances surpass those of the common cameras as well as those of the human eye.

A further advantage lies in that the system according to the present invention provides an objective digital recording of the event itself, obtained by an advantageous positioning of the cameras and the concomitant acquisition of the observed scene. This recording enable to subsequently review the scene at will, to validate the signaled event (goal/non-goal), as it typically happens in the case of a digital viewer having high time resolution and simultaneous multivision.

BRIEF DESCRIPTION OF THE DRAWINGS

Further advantages, features and operation modes of the present invention will be made apparent by the following detailed description of preferred embodiments thereof, given by way of a non-limiting example, making reference to the figures of the attached drawings, wherein:

FIG. 12 is the block diagram of a third embodiment of the system according to the present invention;

FIG. 14 is the block diagram of a fourth embodiment of the system according to the present invention; and FIG. 15 shows an exemplary positioning of the cameras with the views of the observed scene thereof, for the system of FIG. 14.

DETAILED DESCRIPTION OF THE INVENTION

Figure 1:
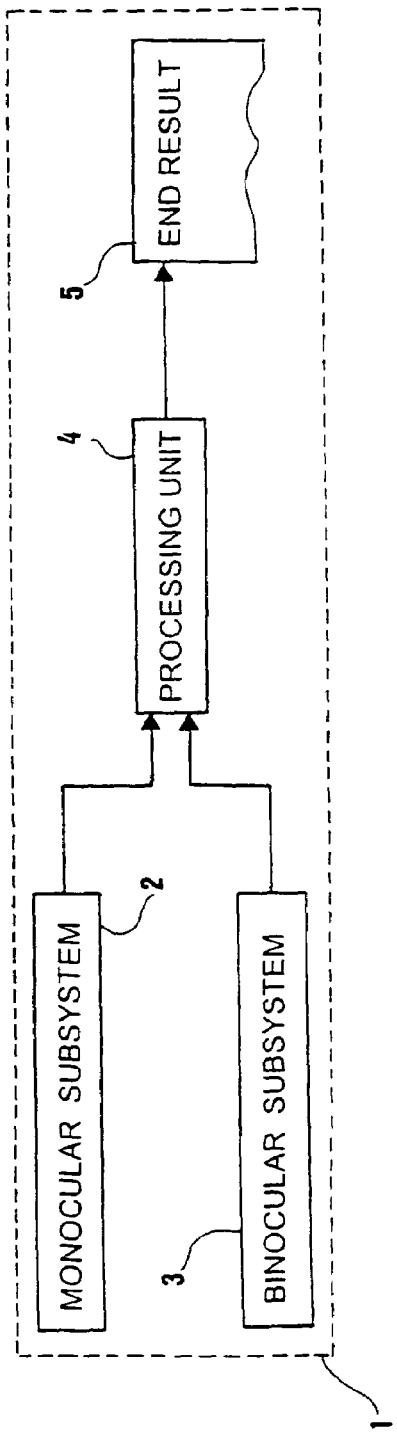
FIG. 1 is a block diagram of a first embodiment of the system according to the present invention.

With initial reference to FIG. 1, a first embodiment of the system according to the present invention is shown.

According to this embodiment, the system 1 comprises one or more subsystems 2, 3 apt to concomitantly acquire images of the portion of the field of play at issue comprising the selected point of reference, in particular of the goal area.

The subsystem 2 is of a monocular for processing images acquired from a single position, whereas the subsystem 3 is of a binocular for processing pairs of acquired images from two distinct positions. The operation of the two types of subsystems will be detailed hereinafter.

The monocular subsystem 2 and the binocular subsystem 3 are independent with respect to each other, each one being adapted to provide information data related to the position of the ball when the latter enters the respective visual field.

These data are forwarded to a processing unit 4 for comparison and computing an end result 5.

Figure 2:
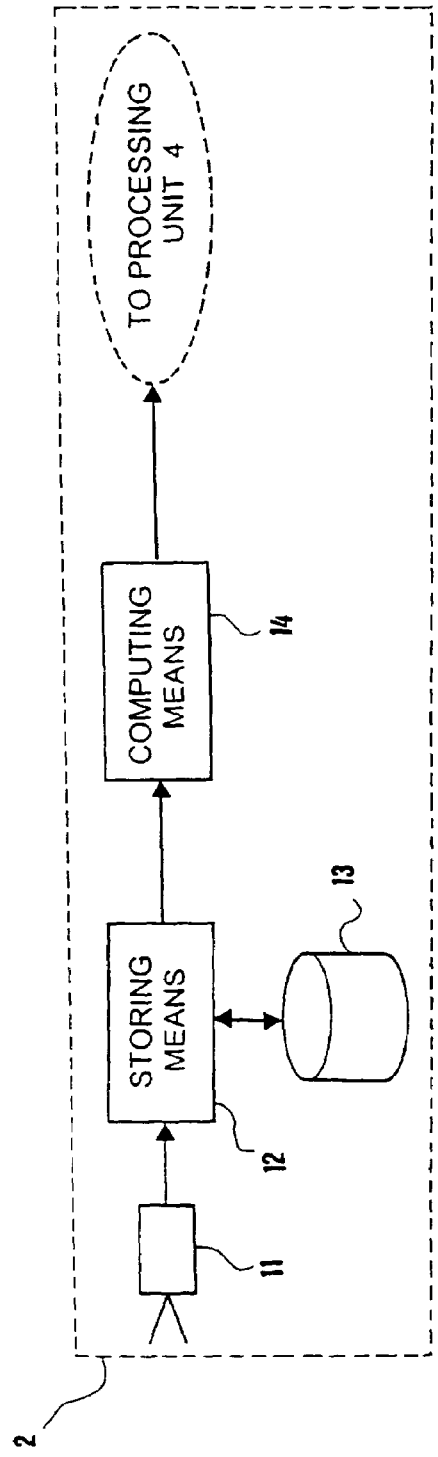
FIG. 2 is a block diagram of a monocular subsystem according to the present invention.

Next, FIG. 2 is a block diagram depicting a monocular-type subsystem 2.

The subsystem 2 comprises an image transducer 11, e.g. a camera. This camera 11 should be selected from those enabling the acquisition of the greatest possible number of images per second, so as to minimize the ball translation Ds between two successive images. In fact, the camera can detect with certainty the goal-scoring event solely when the ball has crossed the goal line a distance at least equal to $\Delta s/2$.

By way of an example, using a 'Dalsa Motion® Vision progressive Scan Area'—type camera and in particular an CA-D6 0512 model, enabling the acquisition of 262 images/sec with a 536×516 pixel resolution, for a hypothetical ball speed of 120 Km/h, the subsystem 2 can detect with certainty the goal scoring event when the ball has crossed the goal line of 6.5 cm.

The format of the data outputted by the camera is digital, and it meets the standard EIA-644, i.e. it is interfaced with other electronic apparatus for the storing and the processing of the acquired images. In particular, high-speed storing means 12, based e.g. on Ultra 2 SCSI technology with 10000 rpm disks (Seagate®) are provided. Thus, all the acquired images are stored in a database 13.

The acquired images are processed by specific computing means 14. Such computing means 14 comprises dedicated systems, like e.g.:

DATACUBE MAXPCI®, based on an architecture consisting of several components (convolutor, ALU, Warper, etc.), enabling to perform an 8×8 convolution step on a 512×512×8 bit image in 7 ms;

MATROX GENESYS®, based on a TI C80 DSP multiprocessor architecture, providing up to three processors for each card, up to a maximum of six cards, with 100 Bops performances; or ALACRON FANTISMAGE®, based on a PCI multiprocessor (up to eight) TRIMEDIA 1×100 architecture (Philips Semiconductor) enabling 500 Mflop performances.

Alike architectures are required due to the considerable amount of required computing and for the real-time obtainment of the result.

Figure 3:
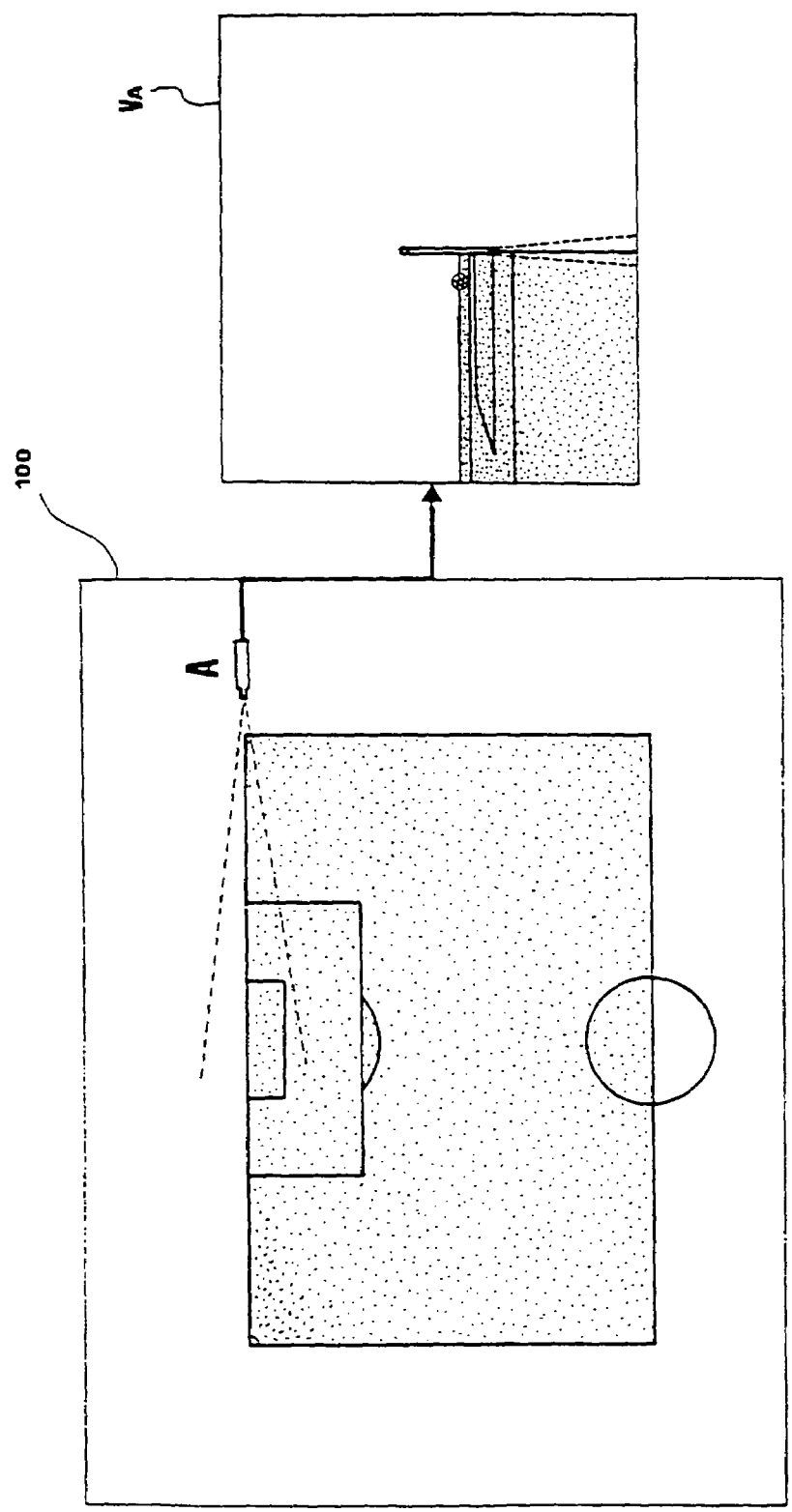
FIG. 3 shows an exemplary positioning of the camera, and the related view of the observed scene, for a monocular subsystem according to the present invention.

FIG. 3 shows a preferred positioning for a camera A with respect to the field of play 100 during the use of a monocular subsystem 2 and the image Va thereof acquired by the camera A.

According to this first embodiment of the system 1, the monocular subsystem 2 comprises a camera A positioned with the optical axis lying on the goal line plane in the direction of the goal, for autonomously detecting the goal scoring event represented by the ball crossing over the goal plane.

Of course, other positions could be provided in order to attain improved system performances.

The use of a monocular subsystem 2 as the one hereto described enables the implementation of a qualitative-type method for the detection of the goal scoring event according to the visual information obtained by a camera with no measuring, merely referring the position of the ball observed on each image to several fixed points of reference. In this context, the latter are provided by the goal structure. Hence, hardware and software processing means implement a first qualitative-type decision-making system. The latter, upon being inputted as an image, outputs in real-time a signal indicating whether the image represents the considered event.

According to a first embodiment of the monocular subsystem 2, the processing of the acquired images comprises two essential steps:

Recognizing the object ball inside of the image; and

Locating the ball with respect to predetermined points of reference.

The recognizing of the object ball can be performed by object recognition technologies based on contour or area analysis.

These methodologies are well known to those skilled in the art, hence a further detailing thereof will be omitted. In particular, according to this first embodiment of the monocular subsystem, a recognition technique based on example learning called SVM (Support Vector Machine) was used.

Figure 4B:
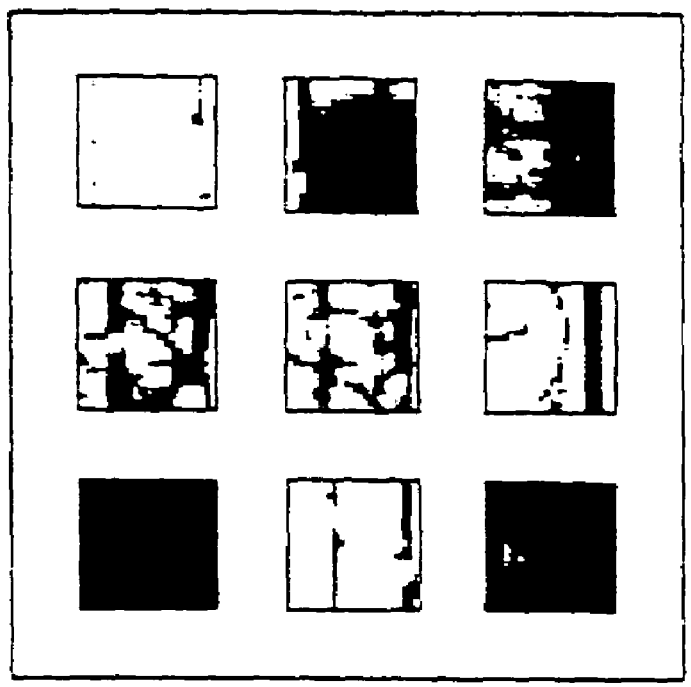
FIGS. 4a and 4b show some images of examples processed during the training step of a Support Vector Machine for classification used in a first embodiment of the monocular subsystem according to the present invention.
Figure 4A:
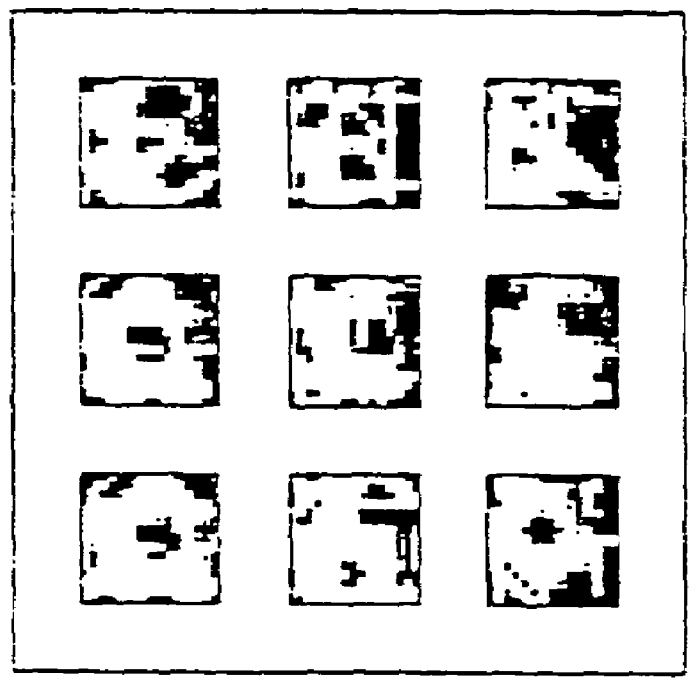

Next, FIGS. 4a and 4b show some sets of exemplary images used to this end.

The ball-recognizing step is performed so as to solve various problems, which may be encountered in a likewise application.

In particular, the difficulties related to the environmental conditions (intensity and direction of the lighting of the taken area, presence of shadows), to the indistinctness of the ball onto the background of the taken scene and to the measurement of 'false positives' and/or of 'false negatives' are taken into account and overcome.

This problems are tackled and solved by a preprocessing of each acquired image, substantially performed by carrying out software-type procedures aimed at:

reducing the search area of the object in each image; and extracting identifying information of the object, useful to the detection and to the localization thereof inside of the image.

In order to solve the abovecited problems, a preprocessing module, acting on an analysis of the gray tones, on the correlation among consecutive images and on a windowing around the position of the preceding image, is provided.

The method according to the present invention provides a training step with examples aimed at implementing a classifier, e.g. of the two-class (ball/non-ball) type, for cataloguing each image in one of the two classes with the least possible error.

This training step comprises the following steps:

acquiring a plurality of exemplary images, positive and negative examples of the object ball to be extracted therefrom;

preprocessing of each extracted example, consisting in an equalizing of the histogram, quantizing the gray level thereof and masking in order to eliminate the edge effects; and training the classifier by an SVM-type technique.

Hence, the method for the detection of the considered event provides:

the continuous acquisition of images of the goal area;

for each acquired image, the extraction of all viable subimages having dimensions equal to that of the examples used during the SVM ball recognition training step;

each subimage is preprocessed as described above and it is classified as ball or non-ball by the SVM classifier;

when a subimage is an instance of the ball, its position in the image with respect to that of the goalpost (known a priori) is used to decide whether the goal-scoring event has occurred.

According to a second embodiment of the monocular subsystem 2, the processing of the acquired images provides a training step aimed at implementing a classifier, in particular of the two-class type, and to catalogue with the least possible error each image in one of the two goal/non-goal classes.

With respect to the previous embodiment, the classifier directly provides the end result, i.e. a decision on the occurrence of the considered event (goal/non-goal).

Figure 5B:
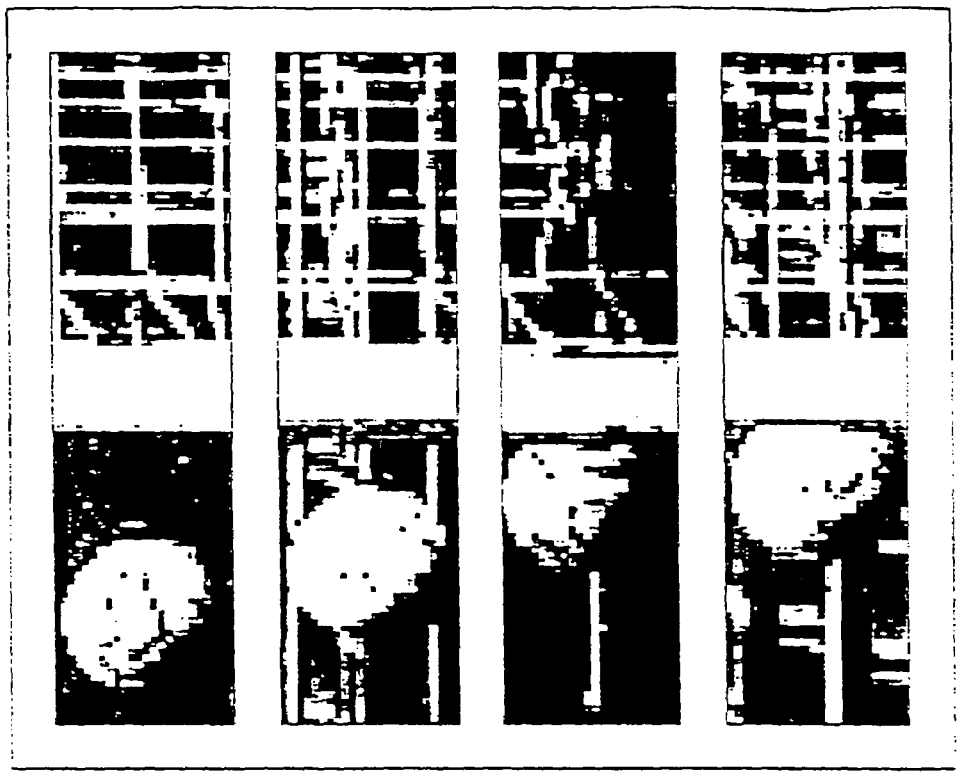
FIGS. 5a and 5b show some images of examples processed during the training step of a neural network used in a second embodiment of the monocular subsystem according to the present invention.
Figure 5A:
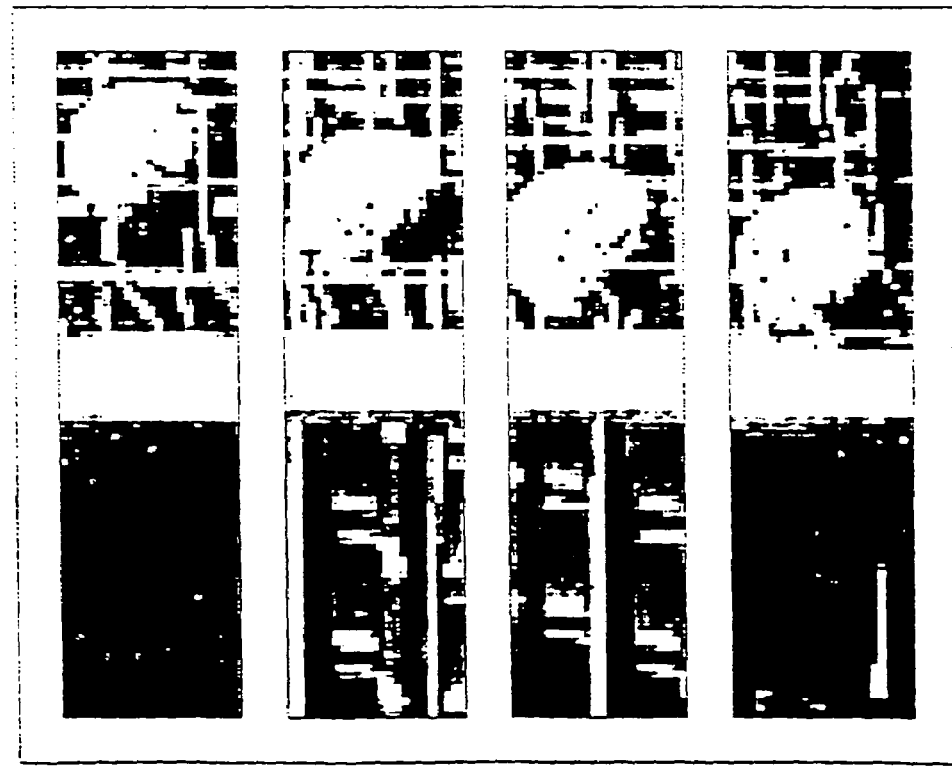

This training step comprises the following steps:

acquiring a plurality of images, positive and negative examples of the goal scoring concept to be extracted therefrom, as illustrated in the subsequent FIGS. 5a and 5b;

preprocessing of each extracted example, consisting in an equalizing of the histogram and a subsequent quantizing of the gray levels thereof; and training the classifier, by a neural network-based technique.

In this case, the method for the detection of a goal scoring provides:

the continuous acquisition of images of the goal area;

for each acquired image, the extraction of all the viable subimages having dimensions and typology alike to those of the examples used during the training step;

each subimage is preprocessed as hereto described and it is classified as goal/non-goal by the neural network.

The neural network used consists of three levels: a first input level, a second intermediate level and a third output level.

The number of nodes of the levels is determined according to the size of the problem at issue. The first level has a number of nodes, defined by the dimension of the input subimages, whereas the output level has a single node, as the problem requires a binary-type (goal/non-goal) response.

The operation principles of a neural network are well known to those skilled in the art, hence will not be detailed hereinafter.

FIGS. 5a and 5b show some subimage sets, respectively used as positive and negative examples, of goal scoring during the training step of the decision-making system. These examples substantially consist of real images depicting a side view of the goal with a ball taken in all the possible positions and under different visibility conditions.

During the training step, the neural network classifier learns to recognize the occurrence of the goal-scoring event according to the information contained in the exemplary images provided.

Each taken image is processed by the decision-making system, which returns a response on the actual detection of a goal scoring.

The image sets employed during the classifier training step should cover most of the actual situations which might occur, thereby ensuring a correct operation of the system and reliable responses even under less-than-ideal conditions, e.g. of visibility.

Of course, the classification techniques (SVM and neural network) adopted in the abovedescribed two different embodiments of the monocular subsystem 2 can indifferently be used in the two cases, without thereby changing the overall operation principle of the system. I.e., for the ball recognition also a neural network-based classifier or an SVM-type classifier for the identification of the goal-scoring event could be used.

However, the abovedescribed classification techniques are not the only ones useful in tackling the problem at issue. Actually, any two-class classifier based on an example-learning technique could be used in both embodiments of the monocular subsystem 2 according to the present invention.

Figure 6:
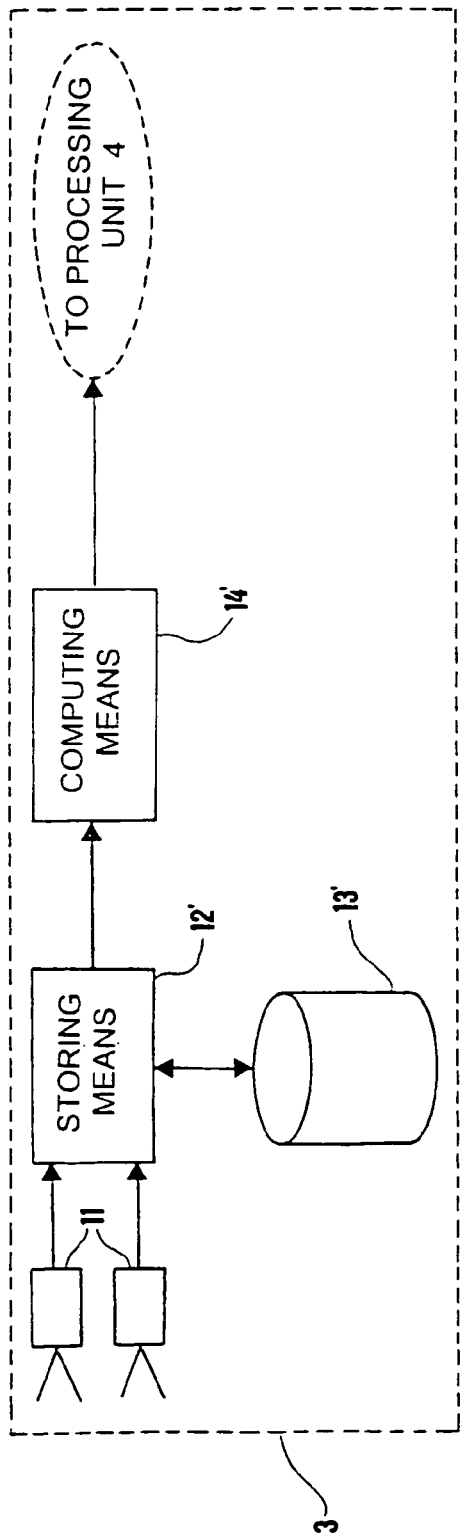
FIG. 6 is a block diagram of a binocular subsystem according to the present invention.

FIG. 6 is a block diagram of the binocular subsystem 3.

A pair of image transducers 11, e.g. high-speed cameras of the abovedescribed type, acquires images of the area of the field of play at issue.

These images are stored by storing means 12' on a file 13' and processed by computing means 14'.

These computing means are like those previously described in connection with the monocular systems, and hence will not be detailed further.

Figure 7:
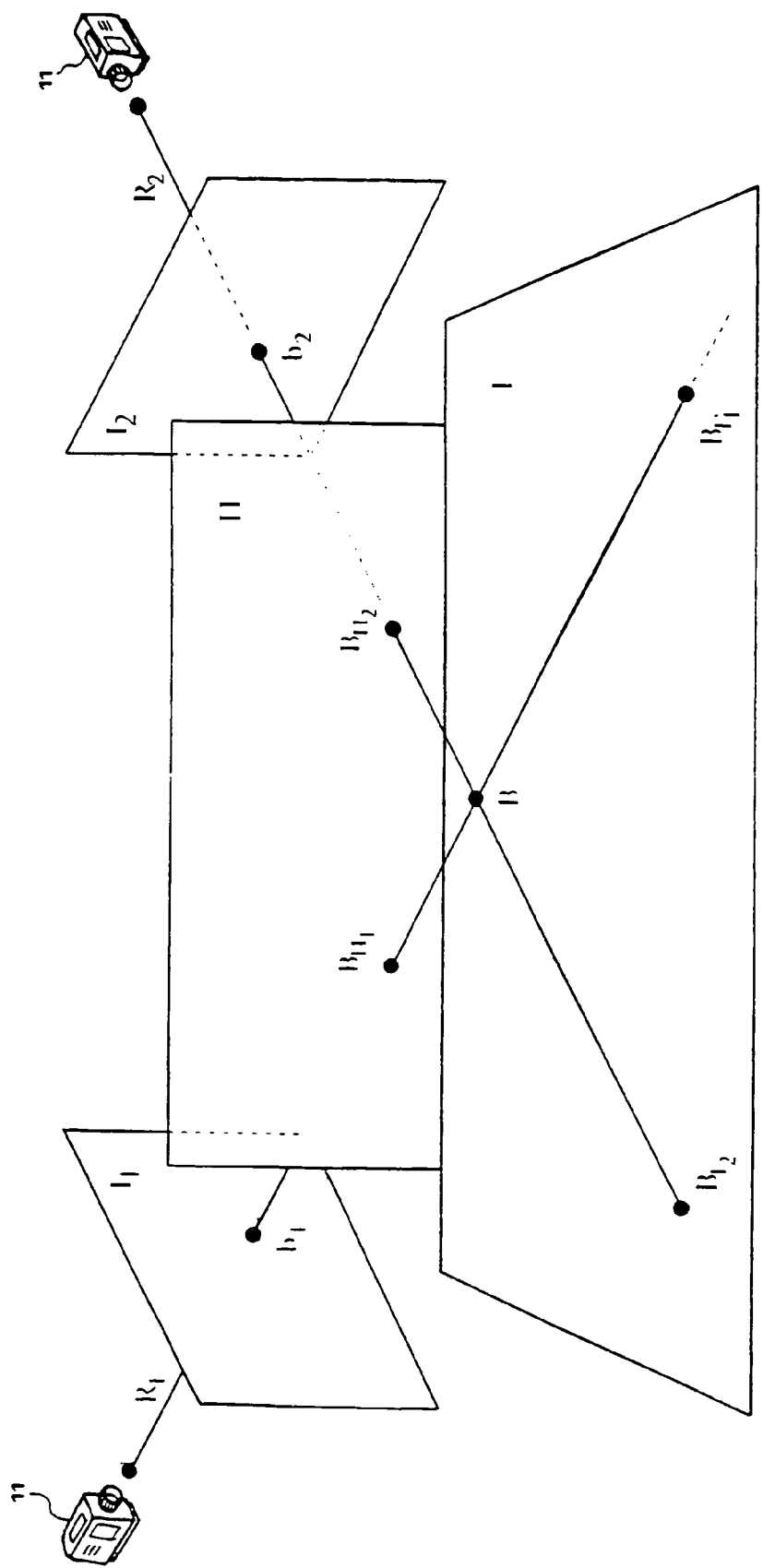
FIG. 7 sketches the operation principle of the binocular subsystem according to the present invention.

With reference to FIG. 7, the binocular subsystem 3 is based on the measuring of the thee-dimensional position of the center of mass B of the ball taken as point of intersection of the lines of sight $\{Ri\}$ generated by two cameras 11 taking the area from different points of sight:

$$B = R_1 \times R_2$$

For each point of sight considered a line of sight $R_i$ is generated by the optical center of the camera, intersecting the center of mass B of the ball in the three-dimensional space and the center $b_i$ of the projection of the ball on the image plane $I_i$.

For each camera, the line of sight intersecting the ball center is determined by the two intersections thereof with the goal plane $\Pi$ and the field of play plane $\Gamma$. These intersections are estimated from the position of the ball on the image plane and from information known a priori on the spatial position of the goalposts and of the lines delimiting the goal area.

In particular, each line of sight is computed as follows:
estimating a first projective transformation $H_{\Gamma i}$ between a first known three-dimensional plane, e.g. the plane of the field $\Gamma$, and the projection thereof on the image plane $I_i$ (homography $H_{\Gamma i}$), from the correspondences of the four intersection points $\{P_j\}$j=1, . . . ,4 of the four orthogonal field lines $\{L_j\}$j=1, . . . ,4 delimiting the goal area, whose positions in the Euclidean space are known a priori, and the respective projections $\{p_j\}$j=1, . . . ,4 in the image $I_i$;
estimating a second projective transformation $H_{\Pi i}$ between a second known three-dimensional plane, e.g. the goal plane $\Pi$, and the projection thereof on the image plane $I_i$ (homography $H_{\Pi i}$), from the correspondences of the four points of intersection $\{Q_j\}$j=1, . . . ,4 of the two vertical lines, onto which the outside edges of the two goalposts lie, to the goal line and to the horizontal line onto which the outside edge of the crossbar lies, and the respective projections $\{p_j\}$j=1, . . . ,4 in the image $I_i$;
estimating the projection $B_{\Gamma i}$ of the center of mass of the ball B onto the field of play plane $\Gamma$ projecting the image $b_i$ thereof with the homography $H_{\Gamma i}$:

$$B_{\Gamma i} = H_{\Gamma i} b_i;$$

estimating the projection $B_{\Pi i}$ of the center of mass of the ball B onto the goal plane $\Pi$ projecting thereon the image bi thereof with the homography $H_{\Pi i}$:

$$B_{\Pi i} = H_{\Pi i} b_i;$$

estimating the line of sight $R_i$ from the two points of intersection thereof with the field of play plane $B_{\Gamma i}$ and the plane onto which the goal $B_{\Pi i}$ lies:

$$R_i = B_{\Gamma i} \times B_{\Pi i}.$$

The binocular subsystem requires the following information input:
two images (I1, I2) referring to two different sights obtained by two uncalibrated cameras;
the coordinates, on any image plane, of the ball center $b_i$, estimated adopting the technique based on example learning with the SVM algorithm used in the monocular system as well. Alternatively, any one known pattern recognition technique could be adopted;
the intersections $\{p_{ij}\}$ of the field of play lines delimiting the goal area in any image plane;
the intersections $\{q_{ij}\}$ of the lines delimiting the goal in any image plane;
the intersections $\{P_j\}$ of the field of play lines delimiting the goal area onto the Euclidean plane $\Gamma$ of the field of play; and
the intersections $\{Q_j\}$ of the lines delimiting the goal structure in the three-dimensional Euclidean space.

Figure 8:
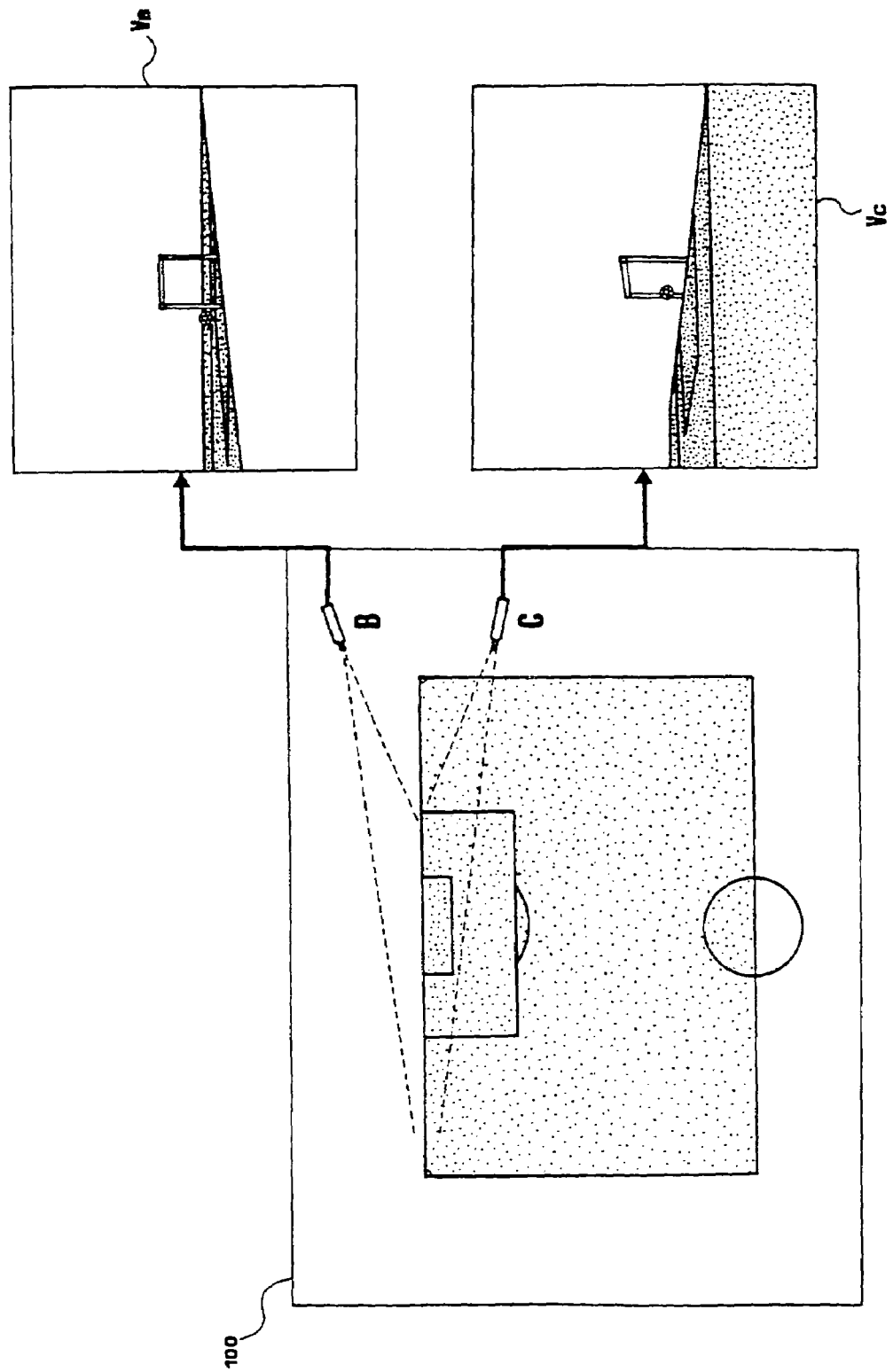
FIG. 8 shows an exemplary positioning of the cameras and the views of the observed scene thereof, for a binocular subsystem according to the present invention.

FIG. 8 is a top plan view of the field of play showing an advantageous positioning of the two cameras B, C of the binocular subsystem 3 near the goal, adapted to minimize the error in the estimate of the distance of the ball from the goal plane. The cameras acquire images like those indicated by Vb and Vc in the figure.

Figure 9:
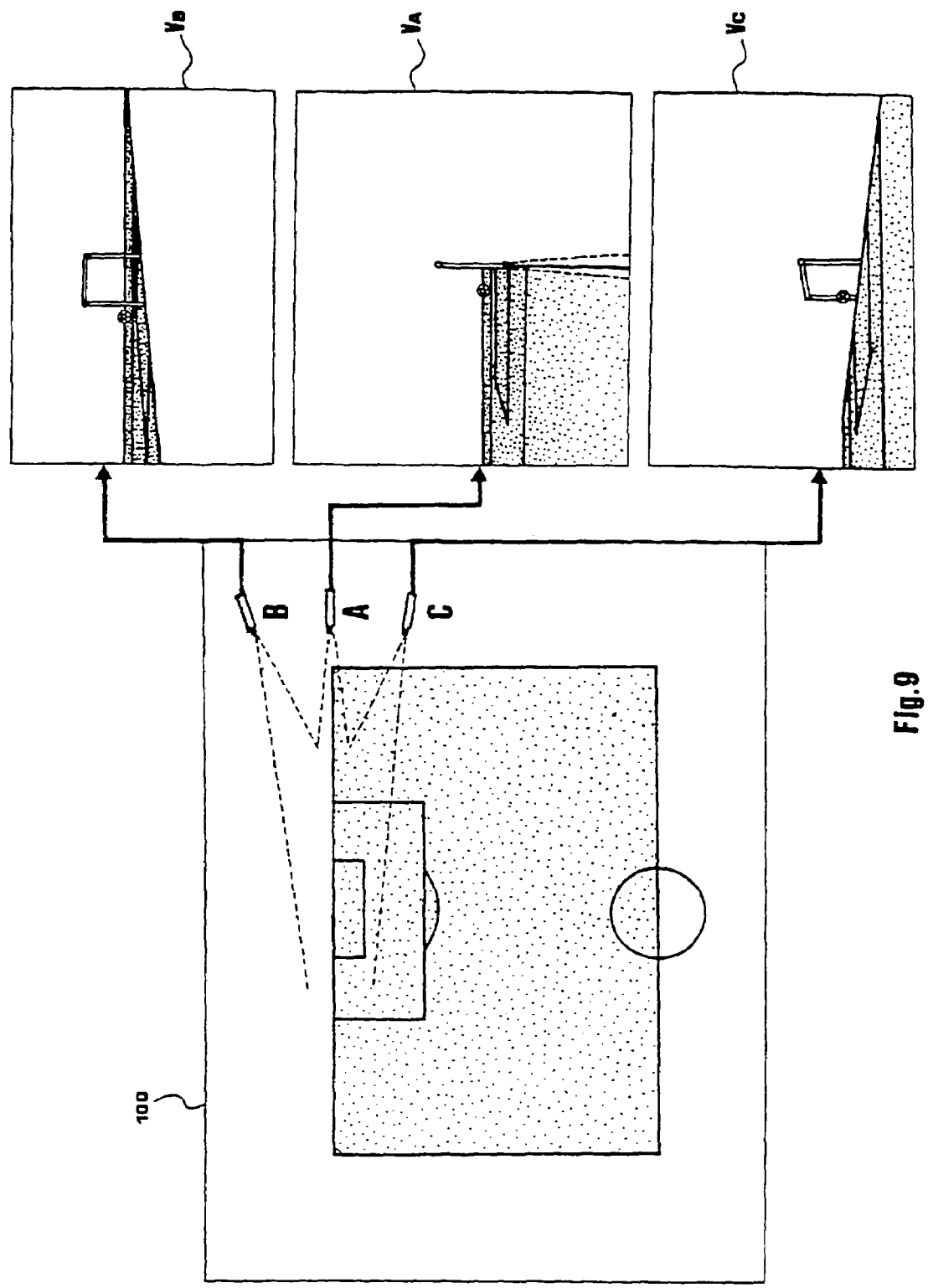
FIG. 9 shows an exemplary positioning of the cameras and the views of the observed scene thereof, for the system of FIG. 1.

FIG. 9 shows the system 1 according to the disclosed first embodiment, providing the combined use of a monocular subsystem 2 (camera A) and of a binocular subsystem 3 (cameras B and C) and the respective views of the acquired images Va, Vb and Vc.

In this case as well, other positions could be provided in order to better adjust the system operation to the specific application.

The binocular subsystem 3 can autonomously detect the goal scoring event, intended as the crossing over of the goal line by the ball, via a second metric-type decision-making system using the measurement of the three-dimensional positioning, yet, generally speaking, it cannot provide a visually assessable confirmation thereof.

The monocular subsystem 2 can autonomously determine only the position of the ball with respect to the goal plane, providing an objective confirmation thereof in the related recording. In fact, without additional sights, a ball having crossed over the goal line yet lying outside of the goal can appear to lie therein.

According to the first embodiment, the system 1 integrates the two subsystems, overcoming the limitations that each one thereof would entail when individually used.

As the monocular subsystem 2 enables one to determine solely the position of the ball with respect to the goal plane, the addition of the sights of the binocular subsystem 3 allows one to recognize also those crossings of the goal line taking place outside of the goal.

The addition of the monocular subsystem to the binocular one, besides enhancing the reliability of the automated detection of the event, further enables an advantageous visual confirmation thereof.

The binocular 3 and the monocular 2 subsystems independently assess the crossing of the goal line. The redundancy of the assessments provided by the two subsystems increases the reliability of the automated detection of the goal-scoring event. The integration of the results provided by the two heretofore described subsystems enables one to obtain a single final assessment of the event with the utmost rate of certainty available.

Figure 10:
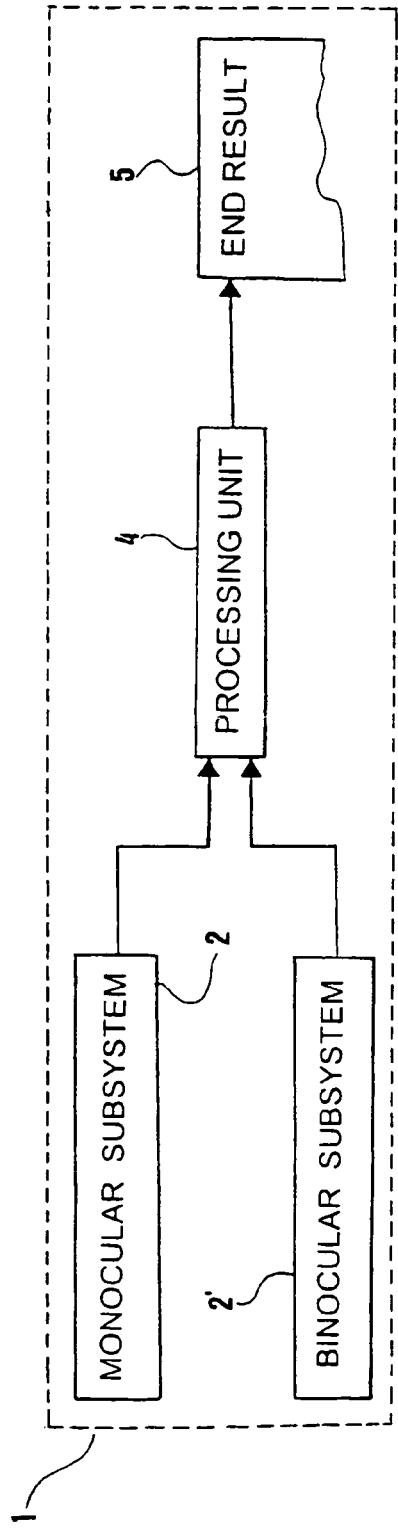
FIG. 10 is the block diagram of a second embodiment of the system according to the present invention.

Making reference to FIG. 10, a second embodiment of the system according to the present invention is shown. According to this embodiment, the system 1 comprises two monocular subsystems 2, 2' of the hereto-described type.

Figure 11:
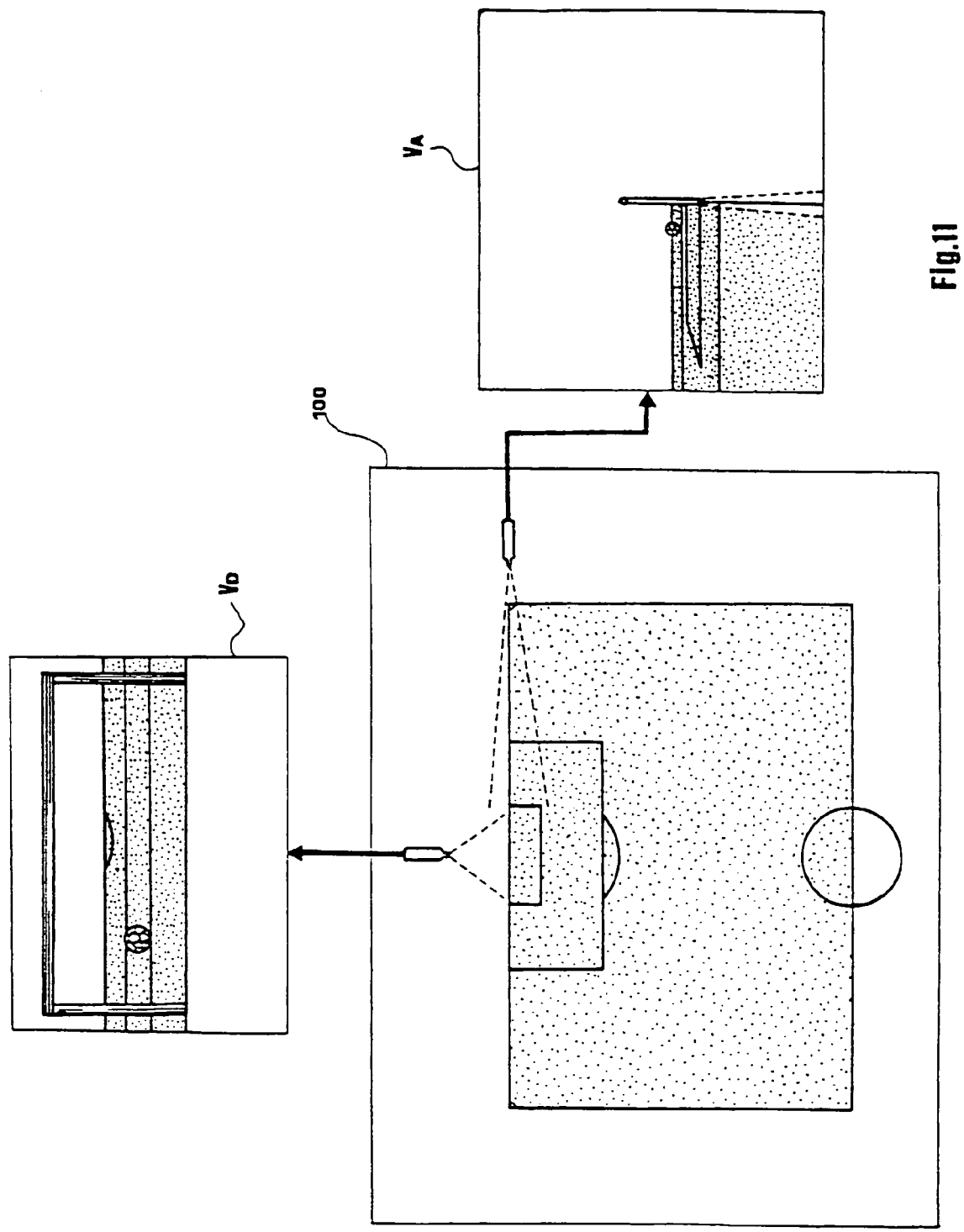
FIG. 11 shows an exemplary positioning of the cameras with the views of the observed scene thereof, for the system of FIG. 10.

Next, FIG. 11 is a plan view of the field of play 100 onto which the cameras A and D of the monocular subsystems 2 and 2' are positioned. The cameras A and D acquire images alike those shown in views Va and Vd, respectively.

In particular, the camera D is positioned with the optical axis perpendicular to the goal plane and passing through the center thereof.

The processing of the acquired images by the camera D consists in singling out the ball in the image, inside of the goal structure.

This step is implemented using an SVM-type classifier, referring the position of the ball to the goalposts and crossbar.

Then, this information is integrated to that provided by the monocular subsystem 2, i.e. to the information on the position of the ball with respect to the goal plane enabling the qualitative detection of the crossing over of the goal line by the ball.

FIG. 12 shows a third embodiment of the system 1 according to the present invention. According to such third embodiment the system 1 comprises three monocular subsystems 2, 2' and 2".

In this case the system 1 provides redundant information, however the redundancy enhances the reliability of the measurement of the scored goal event.

Figure 13:
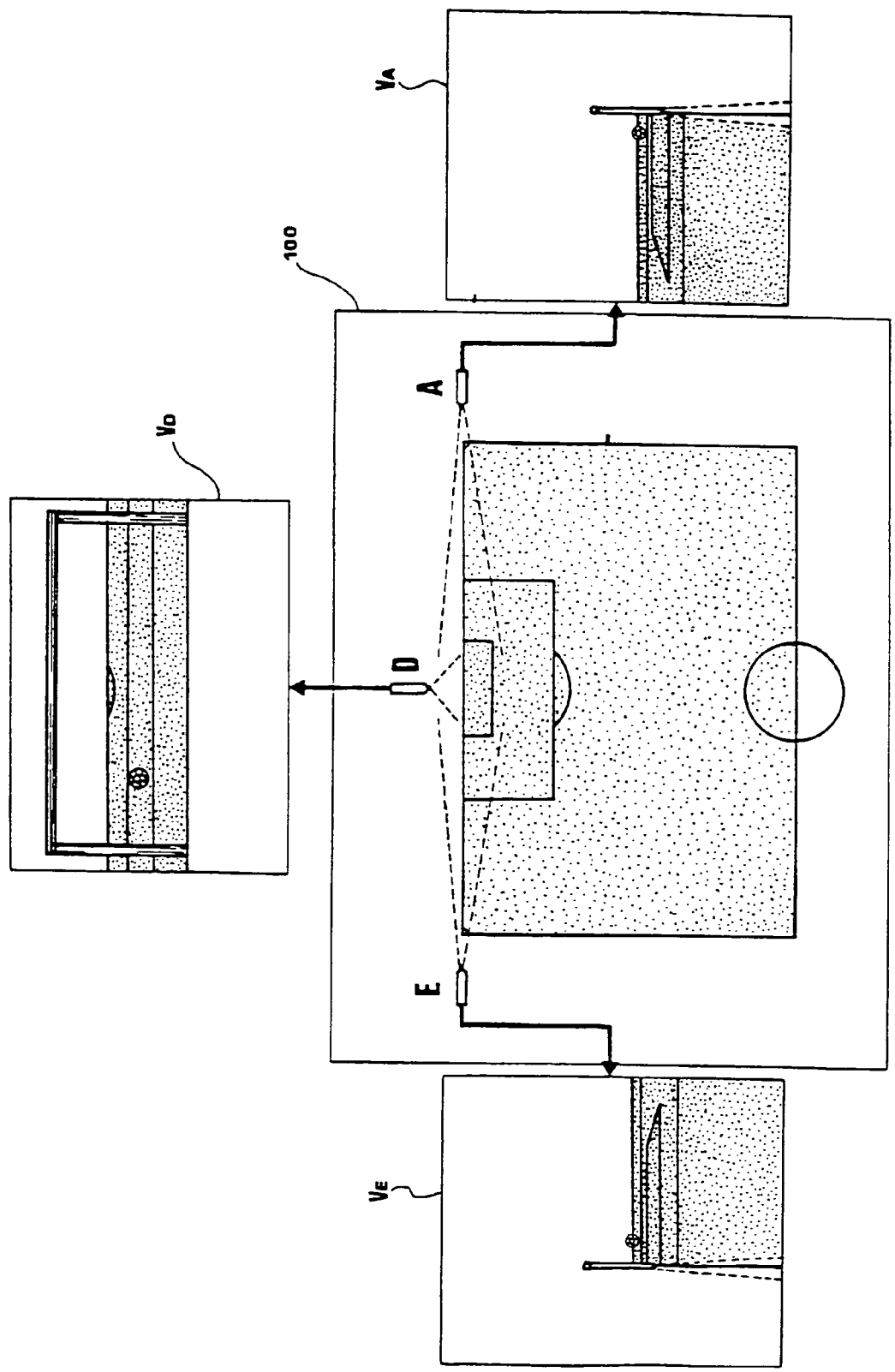
FIG. 13 shows an exemplary positioning of the cameras with the views of the observed scene thereof, for the system of FIG. 12.

Next, FIG. 13 shows a plan view of the field of play 100 and a preferred positioning of the three cameras A, E and D related to the three monocular subsystems. The views Va, Ve and Vd are examples of images acquired by the three cameras.

The use of redundant information is advantageous in order to solve cases of ball obstruction with respect to one of the two symmetrical cameras A and E.

FIGS. 14 and 15 show a fourth embodiment of the system 1 comprising two binocular subsystems 3, 3' of the abovedisclosed type.

In this case, four cameras B, C, F and G are positioned onto the field of play 100, so as to provide respective images alike those shown in views Vb, Vc, Vf and Vg. The combined use of the four cameras and the processing of the images provided enhances the reliability of the detection of the scored goal event and reduces the instances of non-detection, caused e.g. by ball obstruction.

The present invention has hereto been described according to preferred embodiments thereof given as non-limiting examples. It is understood that other embodiments may be provided, all however to be construed as falling within the protective scope thereof, as defined by the appended claims.

The invention claimed is:

1. A method for the measurement of the relative position of an object with respect to a point of reference, comprising the following steps:
   acquiring a plurality of images, each of said images being adapted to display said point of reference;
   processing each image of said plurality of acquired images;
   said step of processing each image further comprising a step of recognizing said object inside each of said images performed by a classifier and training with exemplifying images adapted to the construction of said classifier, and
   computing said relative position of said object with respect to said point of reference by measuring the three-dimensional position of its center of mass, wherein said step of measuring comprises a step of computing the point of intersection of the lines of sight generated by two points of observation, said point of intersection being representative of the position of said center of mass.

2. The method according to claim 1, wherein said object recognizing step comprises a step of preprocessing each of said images.

3. The method according to claim 2, wherein said preprocessing step comprises the steps of:
   analyzing the gray levels of each of said images;
   performing a windowing of each of said images adapted to reduce the search area of said object; and
   extracting identifying information of said object.

4. The method according to claim 3, wherein said step of extracting said identifying information is performed by techniques based on contour or area analysis.

5. The method according to claim 1, wherein for each of said points of observation, the computation of said line of sight comprises the following steps:
   estimating a first projective transformation ($H_{\Gamma i}$) between a first known three-dimensional plane ($\Gamma$), and the projection thereof on the image plane ($I_i$);
   estimating a second projective transformation ($H_{\Gamma i}$ between a second known three-dimensional plane ($\Gamma$) and the projection thereof on the image plane ($I_i$);
   estimating a first projection ($B_{\Gamma i}$) of the center of mass (B) of said object from said image plane ($I_i$) to said known three-dimensional plane ($\Gamma$) by the first projective transformation ($H_{\Gamma i}$);
   estimating a second projection ($B_{\Gamma i}$) of the center of mass (B) of said object from said image plane ($I_i$) to said three-dimensional plane ($\Gamma\Gamma$) by the second projective transformation ($H_{\Gamma i}$); and
   estimating said line of sight, from respective points of intersection with the plane ($\Gamma$) and the plane ($\Gamma\Gamma$).

6. The method according to claim 1, wherein said classifier is based on SVM-type techniques.

7. The method according to claim 1, wherein said classifier is neural network-based.

8. The method according to claim 1, wherein said step of computing said relative position of said object with respect to said point of reference is performed by a first qualitative-type decision-making system.

9. The method according to claim 1, wherein said step of training with exemplifying images comprises the following steps:
   acquiring a plurality of exemplary images;
   equalizing the histogram of each of said exemplary images;
   quantizing the gray levels of each of said exemplary images; and
   providing each of said exemplary images to said classifier.

10. The method according to claim 9, wherein each image of said plurality of exemplary images is an instance of said object.

11. The method according to claim 9, wherein each image of said plurality of exemplary images is an instance of said object with respect to said point of reference.

12. The method according to claim 1, wherein said step of computing said relative position of said object with respect to said point of reference is performed by a second metric-type decision-making system.

13. The method according to claim 1, further comprising a step of storing each of said acquired images.

14. A system adapted to implement a method according to claim 1.

15. A system for the measurement of the relative position of an object with respect to a point of reference comprising:
   one or more image acquisition subsystems, each subsystem being adapted to acquire a plurality of images, each of said images displaying said point of reference; and
   a unit for the processing of said acquired images,
said processing unit comprising a classifier for recognizing said object inside each of said image, said classifier being constructed by training with exemplifying images, wherein each image acquisition subsystem further comprises computing means adapted to compute said relative position of said object with respect to said point of reference by measuring the three-dimensional position of its center of mass as the point of intersection of the lines of sight generated by two points of observation.

16. The system according to claim 15, wherein at least one of said one or more image acquisition subsystems is a monocular-type subsystem.

17. The system according to claim 16, wherein each of said monocular subsystem comprises a single image transducer.

18. The system according to claim 17, wherein each of said image transducers is a camera.

19. The system according to claim 18, wherein each camera is adapted to acquire at least 262 images/sec, with a resolution of at least 512×512 pixels.

20. The system according to claim 15, wherein at least one of said one or more image acquisition subsystems is a binocular-type subsystem.

21. The system according to claim 20, wherein each binocular-type subsystem comprises two image transducers.

22. The system according to claim 15, further comprising means for storing said acquired images.

23. The system according to claim 15, wherein each image acquisition subsystem further comprises computing means adapted to compute said relative position of said object with respect to said point of reference.

24. A sport facility comprising a system for the measurement of the relative position of an object with respect to a point of reference according to claim 15.

25. A method for the measurement of the relative position of an object with respect to a point of reference, comprising the following steps:
  acquiring a plurality of images, each of said images being adapted to display said point of reference;
  processing each image of said plurality of acquired images; said step of processing each image further comprising a step of recognizing said object inside each of said images performed by a classifier and training with exemplifying images adapted to the construction of said classifier based on support vector machine (SVM)-type technique, and
  computing said relative position of said object with respect to said point of reference by measuring the three-dimensional position of its center of mass.

26. A method for the measurement of the relative position of an object with respect to a point of reference, comprising the following steps:
  acquiring a plurality of images, each of said images being adapted to display said point of reference;
  processing each image of said plurality of acquired images; said step of processing each image further comprising a step of recognizing said object inside each of said images performed by a classifier and training with exemplifying images adapted to the construction of said classifier which is neural network-based, and
  computing said relative position of said object with respect to said point of reference by measuring the three-dimensional position of its center of mass.

* * * * *